United States Patent
Wood

(10) Patent No.: US 6,843,444 B2
(45) Date of Patent: Jan. 18, 2005

(54) TRACKING MEANS FOR PRECISION CORD LENGTH ON TWO DRUMS

(75) Inventor: Douglas Bruce Wood, Lincoln, NE (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 10/329,005

(22) Filed: Dec. 24, 2002

(65) Prior Publication Data
US 2004/0118963 A1 Jun. 24, 2004

(51) Int. Cl.[7] .............................................. B65H 18/08
(52) U.S. Cl. .................... 242/534.1; 198/806; 198/847; 226/17
(58) Field of Search ............................... 242/410, 418, 242/419, 443, 529, 534.1, 563.1; 198/806, 837, 840, 842; 226/17, 21

(56) References Cited

U.S. PATENT DOCUMENTS

| | | | | |
|---|---|---|---|---|
| 3,180,548 A | * | 4/1965 | Stafford | 226/195 |
| 3,246,857 A | * | 4/1966 | Morse | 242/334 |
| 3,327,839 A | * | 6/1967 | Arnold et al. | 198/835 |
| 3,368,665 A | * | 2/1968 | Frank | 198/806 |
| 3,550,757 A | * | 12/1970 | Kaspar | 198/813 |
| 3,710,927 A | * | 1/1973 | Alsted | 198/807 |
| 3,715,027 A | * | 2/1973 | Fujimoto | 198/806 |
| 3,759,432 A | * | 9/1973 | Hutzenlaub | 226/42 |
| 3,762,663 A | * | 10/1973 | Nedreski | 242/412.3 |
| 3,901,379 A | * | 8/1975 | Bruhm | 198/831 |
| 3,913,729 A | * | 10/1975 | Andrews | 198/807 |
| 4,955,466 A | * | 9/1990 | Almes et al. | 198/831 |
| 5,369,477 A | * | 11/1994 | Foote et al. | 399/102 |
| 5,394,977 A | * | 3/1995 | Cline | 198/831 |
| 5,833,106 A | * | 11/1998 | Harris | 226/17 |
| 6,105,899 A | * | 8/2000 | Harris | 242/615.1 |
| 6,173,830 B1 | * | 1/2001 | Cumberlege et al. | 198/842 |
| 6,328,642 B1 | * | 12/2001 | Pant et al. | 451/307 |
| 6,390,289 B1 | * | 5/2002 | Hoggan | 198/843 |
| 6,433,499 B1 | * | 8/2002 | Cote et al. | 318/432 |
| 6,510,941 B2 | * | 1/2003 | Schermutzki et al. | 198/836.1 |
| 6,656,025 B2 | * | 12/2003 | Pant et al. | 451/56 |
| 2001/0025769 A1 | * | 10/2001 | Roet et al. | 198/837 |
| 2004/0079622 A1 | * | 4/2004 | Yamazaki | 198/831 |

* cited by examiner

Primary Examiner—Emmanuel Marcelo
(74) Attorney, Agent, or Firm—Brouse McDowell; Roger D. Emerson; Heather M. Barnes

(57) ABSTRACT

Method and apparatus for dynamic tracking of a belt as it is built on two rotatable drums separated by a center-to-center distance, especially during the cording process. In one embodiment, both edges of a belt component are temporarily equipped with corded edge binding which is engaged in a gap formed between upper and lower tracking wheels to provide proper alignment of the belt during the cording process and subsequent building steps. In a first tracking assembly, one pair of tracking wheels operates to constrain and align one edge of the belt and another pair, transversely spaced from the first pair, operates to constrain and align the second edge of the belt in the upper span of the belt immediately prior to the belt being positioned on a first drum. In each wheel pair, the axes are biased toward one another and slightly biased in the direction of travel of the belt. A second tracking assembly is positioned to constrain and align the belt immediately prior to the second drum in the lower span of the belt.

11 Claims, 4 Drawing Sheets

TRACKING MEANS FOR PRECISION CORD LENGTH ON TWO DRUMS

BACKGROUND OF THE INVENTION

A. Field of Invention

This invention pertains to the art of methods and apparatuses of producing power transmission belts and more particularly to a method of preventing or minimizing axial movement of underlying elastomer and fabric materials as tensile cord is added to the belt.

B. Description of the Related Art

Elastomeric belt products such as synchronous power transmission belts often include a tensile member layer comprising one or more cords. The cord is wound onto underlying cylindrical layers of belt material prior to the belt being molded and cured.

U.S. Pat. No. 6,390,406 discloses a method and apparatus for applying accurate lengths of a cord to a rotating structure during the construction of an elastomeric belt. The cord is wound onto underlying material in a helical pattern. The cord-laying wheel moves transversely from side to side as the underlying material is rotated either on a mandrel or on a pair of cylinders. During the cord-laying process on a pair of cylinders, the underlying material tends to move transversely due to tension from the cord. The underlying material often has insufficient strength and stiffness to support the cord layer, resulting in stretch of the underlying material along its circumference.

Most synchronous power transmission belts are made on a cylindrical mold drum. Layers of elastomer and fabric are placed on the drum and one or more tensile cords are helically wrapped around the drum. The cords are accurately placed on the drum by a cord laying wheel which is moved along the axis of the drum as the drum rotates, winding the cords in an accurate helix. The drum may also be used as a mold when the belt teeth are formed and the belt is vulcanized. The circumference of the drum must closely match the desired circumference of the belt, so that a different drum is required for each desired belt length.

In an alternative process, belts are cured incrementally in a press or roto-cure machine without a drum that matches the belt circumference. In the alternative process, the cord is wound around two smaller drums that are held at a fixed distance such that the circumference of the cord path around the drums is equal to the circumference that it would have had if wound on a single drum. As the drums rotate, the cord travels from one drum to the next and back. The cords are placed on one drum or in the span between drums by a cord wheel that moves along the axis of the drums as they rotate, again winding the cords in a helix. Because they are not fixed to the drums, the cords, fabric and elastomer layers of the belt can move axially along the drum. The traditional methods of controlling the axial movement (tracking) include using crowned or tapered drums, crossing the axes of the drums, the addition of angled rollers between the drums which drive by friction on the face of the belt, and tentering machines which grip the edge of the belt. Each of these methods causes a variation in the length of the cords when they are wound onto the drums, so they are not suitable for precision-molded synchronous power transmission belts. The circumference of the underlying layers must be close to the belt path circumference about the drums. If the underlying layers are too long, or become stretched along the circumference, they can become wrinkled or folded as the drums rotate. In the alternative process, belts are cured incrementally in a press or roto-cure machine where the belt is placed around two or more small drums that are held at a fixed distance such that the circumference of the cord path around the drums is approximately equal to the circumference that it would have had if placed on a single drum. The drums are rotated to position incremental sections of the belt for molding and vulcanization. Here too, the belt can move axially along the drum.

The present invention provides an improved apparatus and improved methods for minimizing axial movement of the belt as the cord is being wound, as additional layers are added, and as the belt is advanced during molding and vulcanization. The present invention is simple in design and effective in use to provide tracking control without distorting the path of the cord wound onto the belt. It also prevents stretching of the underlying belt material as the drums rotate.

SUMMARY OF THE INVENTION

The present invention is directed to a new and improved method of tracking a belt as it is being built on two rotating drums. The belt includes edge members attached to the edges of the innermost fabric layer to control the tracking of that layer. This invention utilizes wheel assemblies to engage the edge members and direct the movement of the belt.

The edge members also serve as a stiffener to prevent circumferential stretch of the fabric layer as it travels around the drums. The edge members are engaged by first and second wheel assemblies that permit the fabric to move in a direction of travel with minimal rolling resistance. Also, the wheel assemblies create a small tracking force in the opposite direction due to friction between the wheels and fabric. The tracking system is passive in that it does not require any tracking sensors or control system.

According to one aspect of the invention, there is provided an apparatus adapted to track an associated belt as said belt is built on a first and second rotatable drums separated by a center-to-center distance, the belt comprising a longitudinal axis and a transverse width and having a direction of travel as it is built on the pair of drums. The apparatus comprises a first tracking assembly positioned at a first drum in-feed position being operable to engage the associated belt for alignment relative to the first rotatable drum. The drum in-feed position is the area where the portion of the belt in the span between drums engages the drum as the drum rotates.

According to another aspect of the invention, the apparatus further comprises a second tracking assembly positioned at a second drum in-feed position, the second tracking assembly being operable to engage the associated belt for alignment relative to the second rotatable drum.

According to another aspect of the invention, the first tracking assembly includes a first wheel pair comprising a first upper wheel and a first lower wheel, the first upper wheel being rotatable about a first upper wheel axis and the first lower wheel being rotatable about a first lower wheel axis. The first upper wheel axis is disposed at an angle $\alpha_1$ of between about 10° and 80° to the plane of the belt span; the first lower wheel axis is disposed at an angle $\alpha_2$ of between about 10° and 80° to the plane of the belt span; and the first upper wheel and the first lower wheel are spaced a to define a first gap therebetween.

According to another aspect of the invention, the first tracking assembly further includes a second wheel pair comprising a second upper wheel and a second lower wheel, the second upper wheel being rotatable about a second upper wheel axis and the second lower wheel being rotatable about a second lower wheel axis. The second upper wheel axis is disposed at an angle of between about 10° and 80° to the plane of the belt span; the second lower wheel axis is disposed at an angle of between about 10° and 80° to the plane of the belt span; and the second upper wheel and the second lower wheel are spaced to define a second gap therebetween.

According to another aspect of the invention, the second tracking assembly includes first and second wheel pairs substantially similar to the wheel pairs of the first tracking assembly.

According to another aspect of the invention, there is provided a system useful for building a belt on first and second rotatable drums separated by a center-to-center distance, wherein the belt comprises a longitudinal axis and a transverse width, said belt having a direction of travel as it is built on said pair of drums. The system comprises a tracking apparatus comprising a first tracking assembly located at a first drum in-feed position. The system further comprises a belt component having a continuous first edge member located at a first transverse edge of the belt component and a continuous second edge member located at a second transverse edge of the belt component. The first tracking assembly is operable to engage the first and second edge members for alignment relative to the first rotatable drum.

According to another aspect of the invention, in the inventive system, the tracking apparatus further includes a second tracking assembly positioned at a second drum in-feed position. The second tracking assembly is operable to engage the first and second edge members for alignment relative to the second rotatable drum.

According to another aspect of the invention, there is provided a method for building or molding and vulcanizing a belt on a pair of drums separated by a center-to-center distance. The method includes the steps of providing a belt component with a first edge member at a first edge and a second edge member at a second edge; providing a first tracking assembly; and, utilizing the first tracking assembly to position the belt component relative to the first drum.

According to another aspect of the invention, the first edge member is affixed to the first edge of the belt component and the second edge member is affixed to the second edge of the belt component.

According to another aspect of the invention, the first edge member is sonically welded to the first edge of the belt component.

According to another aspect of the invention, there is provided a belt component having a first edge member at a first edge and a second edge member at a second edge.

According to another aspect of the invention, the first edge member comprises a first cord member encased in a first binding member.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein.

DESCRIPTION OF THE PREFERRED EMBODIMENT

Figure 1:
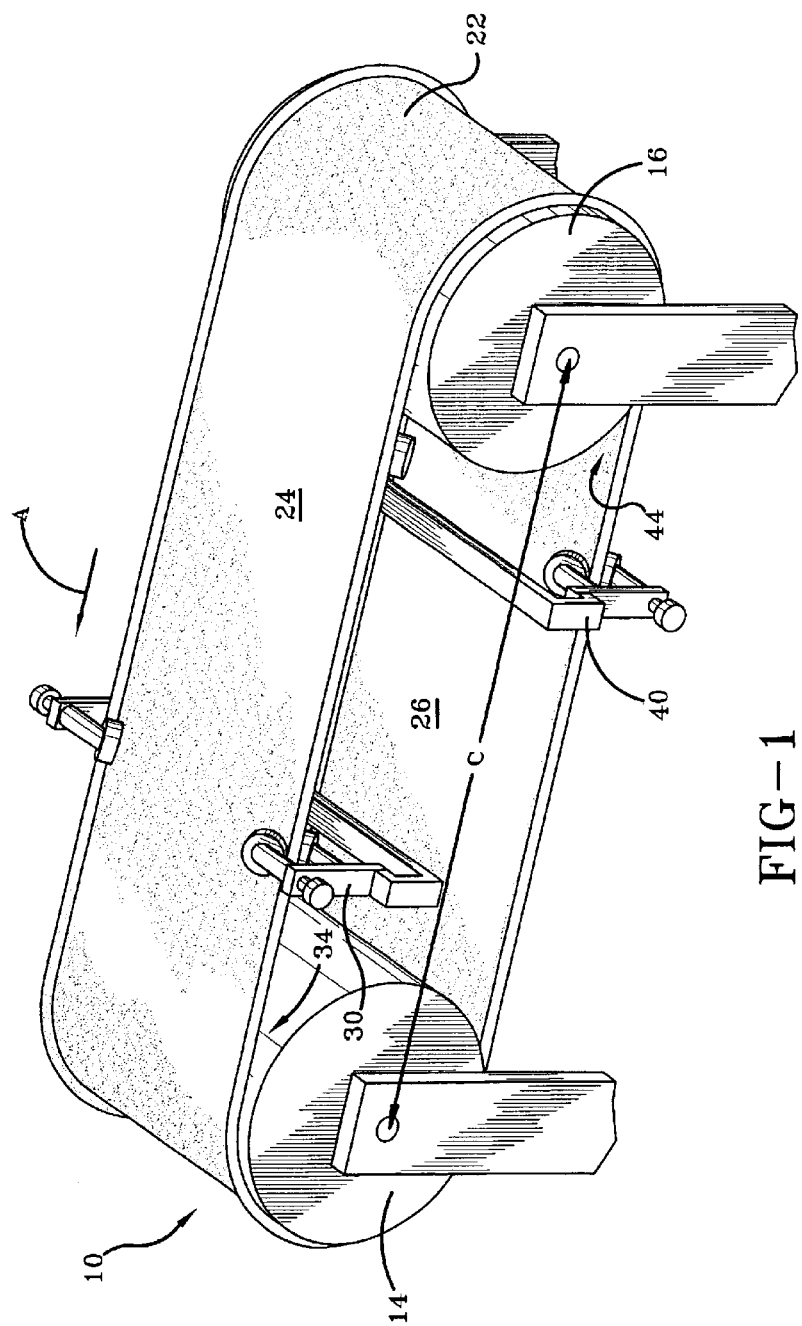
FIG. 1 is a perspective view showing the inventive tracking system.

Referring now to the drawings wherein the showings are for purposes of illustrating a preferred embodiment of the invention only and not for purposes of limiting the same, FIG. 1 shows an apparatus 10 for tracking an associated belt as it is built on first and second rotatable drums 14, 16, respectively. Drums 14 and 16 are separated by a center-to-center distance C. During the belt-building operation, the drums 14, 16 rotate to define a first direction of travel, indicated by arrow A. The drums 14, 16 are used to support and rotate an associated belt component 22 onto which additional layers comprising tensile cord, barrier fabric, tooth stock material, etc. are added. When positioned on the drums 14, 16, the belt component 22 has an upper run 24 and a lower run 26. The present invention operates to track the underlying belt component 22 as additional material, especially the tensile cord, is added.

The building apparatus 10 includes a first tracking assembly 30 located at a first drum in-feed position 34. First drum in-feed position 34 is located near first drum 14 so that the upper span 24 of the belt component 22 may be dynamically aligned in a proper relationship to first drum 14 immediately prior to engagement of the belt 22 to the first drum 14.

In the preferred embodiment, the building apparatus 10 further includes a second tracking assembly 40 located at a second drum in-feed position 44. Second drum in-feed position 44 is located near second drum 16 so that the lower span 26 of the belt component 22 may be dynamically aligned in a proper relationship to second drum 16 immediately prior to engagement of the belt 22 to the second drum 16.

Figure 2:
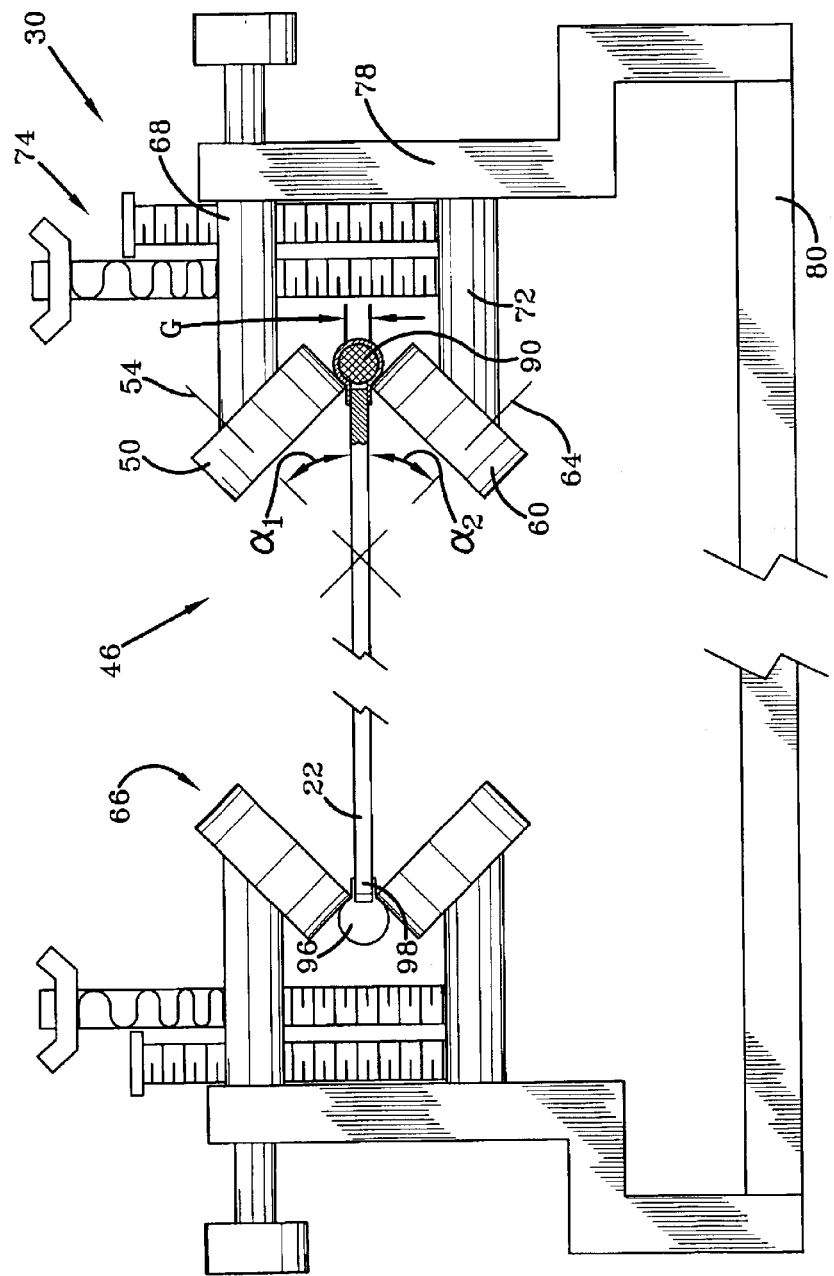
FIG. 2 is a partial side view, partly in section, of a first tracking assembly and belt component according to the present invention.

With reference to FIG. 2, in the preferred embodiment, the first tracking assembly 30 includes a first wheel pair 46 comprising upper wheel 50, rotatable on its axis 54, and a lower wheel 60, rotatable on its axis 64. In operation, the first wheel pair 46 engages one edge member 90 of the associated belt component 22 immediately prior to the first drum. Said engagement prevents edge member 90 and belt component 22 from moving to the left in FIG. 2. The terms "upper" and "lower" are used merely for clarity and convenience with reference to the FIGURES and not by way of limiting the present invention.

In the preferred embodiment, the first tracking assembly 30 further includes a second wheel pair 66, transversely spaced from the first wheel pair 46. In operation, the second wheel pair 66 engages the other edge member 96 of the associated belt component 22. Said engagement prevents edge member 96 and belt component 22 from moving to the right in FIG. 2. The combined leftward and rightward constraint of the belt 22 and edge members 90, 96 is achieved with a minimum of force and deflection when applied at the drum in-feed positions 34, 44. The belt is caused to contact the drums at the desired axial position where it remains while in contact with the drum. The close proximity of the wheels to the in-feed point of contact on the drum creates an angle between the belt circumference axis and the nominal direction of belt motion sufficient to quickly correct even small disturbances of the axial position on the drum. The tracking action of the wheels against the edge members is more repeatable for multiple revolutions of the belt than a tenter which must release and reacquire the belt edge with each revolution.

In a preferred embodiment, in the first wheel pair 46, upper wheel 50 is carried on a distal end of upper arm 68. Lower wheel 60 is carried on a distal end of lower arm 72. In the preferred embodiment, adjustment means such as screw assembly 74 is provided so that upper arm 68 and lower arm 72 are moveable relative to each other to set a desired gap, G, between the upper wheel 50 and lower wheel 60. In the preferred embodiment, axis 54 forms and angle, $\alpha_1$, with the plane of the belt 22. Also, in the preferred embodiment, axis 64 forms an angle $\alpha_2$ with the plane of the belt 22. In the preferred embodiment, $\alpha_1$ and $\alpha_2$ are each between about 10° and 80°, although it is not necessary for $\alpha_1$ to be equivalent to $\alpha_2$.

In the preferred embodiment, upper arm 68 and/or lower arm 72 are pivotally mounted to an end bracket 78. However, any arrangement of parts that provides for positioning of the upper and lower wheels 50, 60 to provide a gap, G, and the desired angles, $\alpha_1$, $\alpha_2$, is within the scope of the present invention.

In the preferred embodiment, the axes of the wheels, and the wheels of the second wheel pair 66, are arranged in similar fashion to the first wheel pair 46.

In the preferred embodiment, first wheel pair 46 and second wheel pair 66 are both mounted to a single mounting block 80 for ease of installation and removal. However, it is within the scope of the present invention to provide separate mounting means for the first wheel pair 46 and second wheel pair 66.

Figure 3:
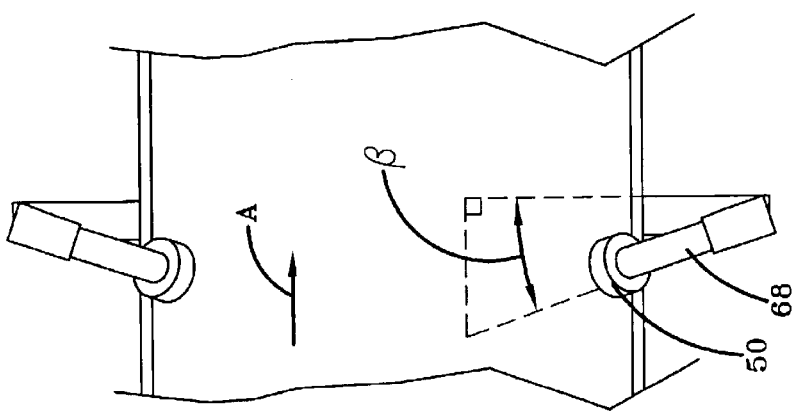
FIG. 3 is a top view of a first tracking assembly and belt component according to the present invention.

With reference to FIG. 3, the upper arm 68 (and lower arm 72) may be arranged so that the axes 54,64 of upper wheel 50 and lower wheel 60 (not shown) which are nearest the belt 22 are biased slightly away, rather than perpendicular to, the direction of travel (arrow A) when a belt component 22 is rotated on drums 14, 16. Angle β is defined as the angle that upper arm 68 makes with the perpendicular. In the preferred embodiment, angle β is between about 0° to about 30°. This angle prevents inadvertent tracking in the opposite direction by frictional contact between the wheels 50, 60 and the belt 22 and keeps the edge member 90 in contact with the wheels.

Figure 4:
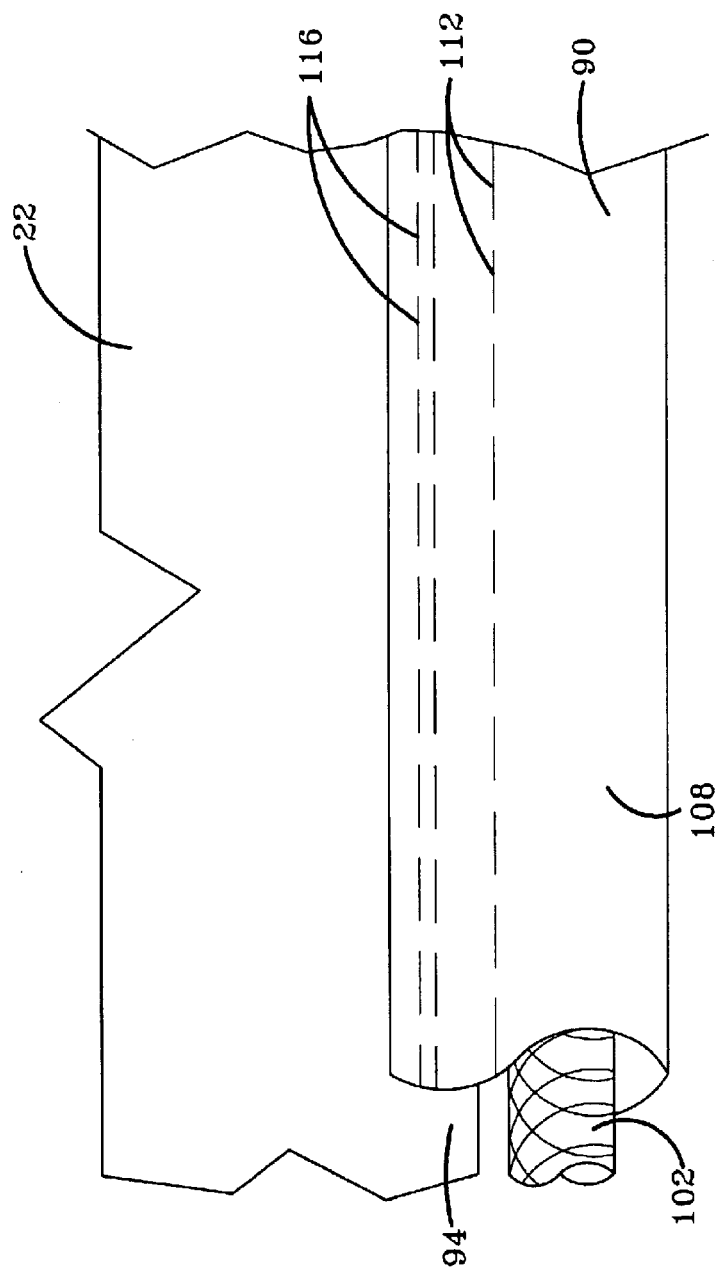
FIG. 4 is partial top view of a belt component and a first edge member according to the present invention.

The present invention is further directed to the belt component 22. As shown in FIGS. 2 and 4, the belt component 22 includes first edge member 90 affixed to a first transverse edge 94 of belt component 22. Belt component 22 further includes a second edge member 96 affixed to a second transverse edge 98. Edge members 90, 96 do not form a part of a completed, molded and cured belt. After the belt is built and cured, the edge members 90, 96 are removed. Therefore, edge members 90, 96 are intermediary members for use during the belt building and curing process.

With particular reference to FIG. 4, the first edge member 90 includes a cord member 102 encased in a binding member 108. Together, the cord member 102 and binding member 108 form the first edge member 90. In the preferred embodiment, the binding member 108 can be sonically welded to itself to encase the cord member 102 as indicated by a first set of welding lines 112. It is within the scope of the present invention to utilize other means for encasing the cord member 102 such as by the use of adhesives or stitching. It is also within the scope of the present invention to utilize a molded or extruded edge member incorporating the enlarged section that is engaged by the wheels, the section attachable to the belt 22, and having a stiffness adequate to prevent stretching of the attached belt layer. The binding member 108 preferably is a folded strip with the cord member 102 positioned against the fold and having open ends. In the preferred embodiment, a transverse edge 94 of the belt component 22 is positioned within the open ends of the binding member 108. Binding member 108 is preferably ultrasonically welded to the transverse edge 94 as indicated by a second set of welding lines 116. Although ultrasonic welding is a preferred method of attaching the edge members 90, 96 other means known in the art such as using adhesives, stitching, extruding or molding are within the scope of the present invention.

In yet another embodiment of the invention, a method for tracking and supporting a belt 22 as the belt is molded and vulcanized is provided. After the belt 22 is fully built as above, the first tracking assembly 30 is further utilized to position the belt 22 relative to the first rotatable drum 16 while the belt 22 is molded and vulcanized in sequential stages.

The preferred embodiments have been described, hereinabove. It will be apparent to those skilled in the art that the above methods may incorporate changes and modifications without departing from the general scope of this invention. It is intended to include all such modifications and alterations in so far as they come within the scope of the appended claims or the equivalents thereof.

Having thus described the invention, it is now claimed:

1. Apparatus adapted to track an associated belt as said belt is built on first and second rotatable drums separated by a center-to-center distance, said belt comprising a longitudinal axis and a transverse width and including a belt component, said belt having a direction of travel as it is built on said pair of drums, said belt defining a belt span between said pair of drums, said apparatus comprising:

a first tracking assembly positioned at a first drum in-feed position, said first tracking assembly being operable to engage said associated belt component for alignment relative to said first rotatable drum, said first tracking assembly including a first wheel pair and a second wheel pair, wherein said first wheel pair comprising a first upper wheel and a first lower wheel, said first upper wheel being rotatable about a first upper wheel axis and said first lower wheel being rotatable about a first lower wheel axis, wherein said first upper wheel axis is disposed at a first angle, $\alpha_1$, to said plane of said belt span, wherein $\alpha_1$ is between about 10° and 80°, and wherein said first upper wheel and said first lower wheel are spaced to define a first gap therebetween; and said second wheel pair transversely spaced from said first wheel pair, said second wheel pair comprising a second upper wheel and a second lower wheel, said second upper wheel being rotatable about a second upper wheel axis and said second lower wheel being rotatable about a second lower wheel axis, wherein the second upper wheel axis is disposed at an angle of between about 10° and 80° to said plane of said belt span, and the second upper wheel and the second lower wheel are spaced to define a second gap therebetween; and a second tracking assembly positioned at a second drum in-feed position, said second tracking assembly being operable to engage said associated belt component for alignment relative to said second rotatable drum.

2. Apparatus adapted to track an associated belt as said belt is built on first and second rotatable drums separated by a center-to-center distance, said belt comprising a longitudinal axis and a transverse width and including a belt component, said belt having a direction of travel as it is built on said pair of drums, said belt defining a belt span between said pair of drums, said apparatus comprising:

a first tracking assembly positioned at a first drum in-feed position, said first tracking assembly being operable to engage said associated belt component for alignment relative to said first rotatable drum, wherein said first tracking assembly includes:

a first wheel pair comprising a first upper wheel and a first lower wheel, said first upper wheel being rotatable about a first upper wheel axis and said first lower wheel being rotatable about a first lower wheel axis, wherein said first upper wheel axis is disposed at a first angle, $\alpha_1$, to said plane of said belt span, wherein $\alpha_1$ is between about 10° and 80°, and wherein said first upper wheel and said first lower wheel are spaced to define a first gap therebetween; and a second wheel pair transversely spaced from said first wheel pair, said second wheel pair comprising a second upper wheel and a second lower wheel, said second upper wheel being rotatable about a second upper wheel axis and said second lower wheel being rotatable about a second lower wheel axis, wherein the second upper wheel axis is disposed at an angle of between about 10° and 80° to said plane of said belt span, and the second upper wheel and the second lower wheel are spaced to define a second gap therebetween.

3. The apparatus of claim 2 wherein said first lower wheel axis is disposed at a second angle, $\alpha_2$, to said plane of said belt span, wherein $\alpha_2$ is between about 10° and 80°.

4. The apparatus of claim 2 wherein:

said first drum in-feed position is located between said first and second rotatable drums and nearer to said first rotatable drum than said second rotatable drum.

5. Apparatus adapted to tracking an associated belt as said belt is built on first and second rotatable drums separated by a center-to-center distance, said belt comprising a longitudinal axis and a transverse width and including a belt component, said belt having a direction of travel as it is built on said first and second drums, said belt defining a belt span between said pair of drums, said apparatus comprising:

a first tracking assembly positioned at a first drum in-feed position between said first and second rotatable drums and nearer to said first rotatable drum, wherein said first tracking assembly is operable to engage said belt component for alignment relative to said first rotatable drum, said first tracking assembly including:

a first wheel pair comprising a first upper wheel and a first lower wheel, said first upper wheel being rotatable about a first upper wheel axis and said first lower wheel being rotatable about a first lower wheel axis, wherein said first upper wheel axis is disposed at a first angle, $\alpha_1$, of between about 10° and 80° to said plan of said belt span and said first lower wheel axis is disposed at an angle, $\alpha_1$, of between about 10° and 80° to said plane of said belt span, and wherein said first upper wheel and said first lower wheel are spaced to define a first gap therebetween, and a second wheel pair transversely spaced from said first wheel pair, said second wheel pair comprising a second upper wheel and a second lower wheel, said second upper wheel being rotatable about a second upper wheel axis and said second lower wheel being rotatable about a second lower wheel axis, wherein said second upper wheel axis is disposed at an angle of between about 10° and 80° to said plane of said belt span and said second lower wheel axis is disposed at an angle of between about 10° and 80° to said plane of said belt span, and wherein said second upper wheel and said second lower wheel are spaced to define a second gap therebetween; and, a second tracking assembly positioned at a second drum in-feed position between said first and second rotatable drums and nearer to said second rotatable drum, wherein said second tracking assembly is operable to engage said belt component for alignment relative to said second rotatable drum, said second tracking assembly including first and second wheel pairs substantially identical to the first and second wheel pairs of the first tracking assembly.

6. A system useful for building a belt on first and second rotatable drums separated by a center-to-center distance, wherein said belt comprises a longitudinal axis and a transverse width, said belt having a direction of travel as it is built on said drums, said system comprising:

a tracking apparatus including a first tracking assembly positioned at a first drum in-feed position; and, a belt component comprising a continuous first edge member located at a first transverse edge of said belt component and a continuous second edge member located at a second transverse edge of said belt component;

wherein said first tracking assembly is operable to engage said first and second edge members for alignment relative to said first rotatable drum;

wherein said first tracking assembly comprises:

a first wheel pair comprising a first upper wheel and a first lower wheel, said first upper wheel being rotatable about a first upper wheel axis and said first lower wheel being rotatable about a first lower wheel axis, wherein said first upper wheel axis is disposed at an angle, $\alpha_1$, of between about 10° and 80° to said plane of said belt span and said first lower wheel axis is disposed at an angle, $\alpha_2$, of between about 10° and 80° to said plane of said belt span, and wherein said first upper wheel and said first lower wheel are spaced to define a first gap therebetween.

7. The system of claim 6, wherein said tracking apparatus further includes a second tracking assembly positioned at a second drum in-feed position, wherein said second tracking assembly is operable to engage said first and second edge members for alignment relative to said second rotatable drum.

8. A method for building a belt on first and second rotatable drums separated by a center-to-center distance, said method comprising the steps of:

providing a belt component with a first edge member at a first edge and a second edge member at a second edge including the steps of:
encasing a first cord member in a first binding member;
ultrasonically welding said first binding member to form a first edge member; and,
affixing said first edge member to said first edge of said belt component;

providing a first tracking assembly; and, utilizing said first tracking assembly to position said belt component relative to said first rotatable drum.

9. The method of claim 8, wherein said step of providing a belt component with a first edge member and a second edge member includes the step of:

affixing said second edge member to said second edge of said belt component.

10. The method of claim 8 wherein said step of affixing said first edge member to said first edge and a second edge member at a second edge includes the step of:

ultrasonically welding said first edge member to said first edge.

11. A method for tracking and supporting a belt as said belt is formed while supported on associated first and second rotatable drums separated by a center-to-center distance, said method comprising the steps of:

providing said belt with a belt component having a first edge member at a first edge and a second edge member at a second edge;

providing a first tracking assembly;

utilizing said first tracking assembly to position said belt component relative to said first rotatable drum;

molding and vulcanizing said belt in sequential stages as said belt is supported on said associated first and second rotatable drums while said first tracking assembly is utilized to position said belt component relative to said first rotatable drum.

* * * * *